March 27, 1962
W. J. DAVIS
3,027,485
CATHODE RAY TUBE DISPLAY
Filed Feb. 16, 1960
2 Sheets-Sheet 1
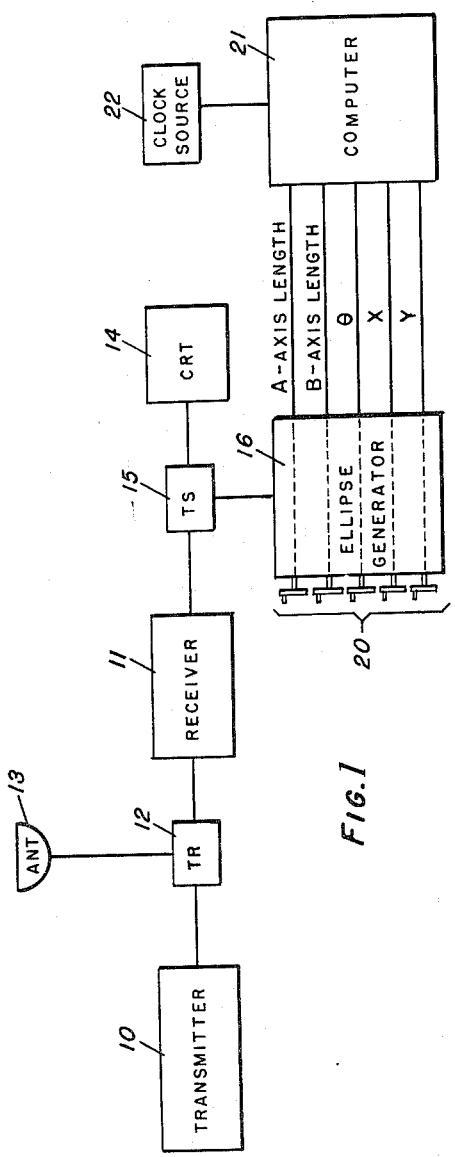
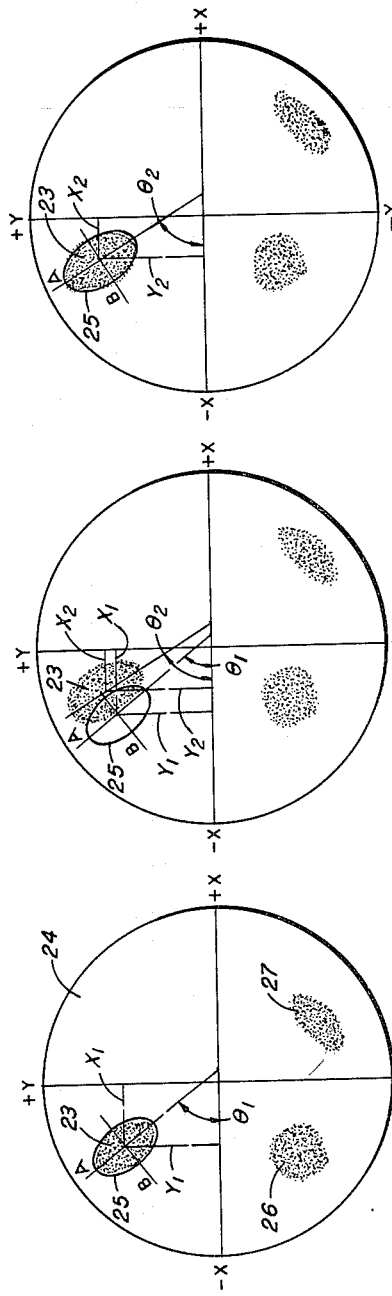

Patented Mar. 27, 1962

3,027,485
CATHODE RAY TUBE DISPLAY
William J. Davis, Granada Hills, Calif., assignor to The Bendix Corporation, a corporation of Delaware
Filed Feb. 16, 1960, Ser. No. 8,999
9 Claims. (Cl. 315—24)

This invention relates to cathode ray tube displays and more particularly to indicators for radar displays of the plan position indicator, or PPI, type.

It has long been known that indicators in a cathode ray tube display can form a valuable tool in allowing the comparison of information displayed on the cathode ray tube with a fixed standard. A prime example is the use of a range marker in range radar. Other examples in radar displays of the PPI type include the control for varying the intensity of the display in selected portions of the cathode ray tube face to point out a particular area or point of interest.

I have found that, in the visual analysis of intensity-modulated information on a cathode ray tube face with a variety of shapes and orientations, the simple plane figure which can best define an irregular area is an ellipse. An ellipse has the further advantage of ease of generation, being the product of a pair of sinusoidal voltages applied respectively to the horizontal and vertical deflection plates or coils of the cathode ray tube. The relative magnitude and phase of the two sinusoidal voltages determine the major and minor axis length and orientation of the ellipse.

I have found that it is possible to control the lengths of the major and minor axes of the ellipse independently to vary its size and shape, and also to change the angular orientation of the axis of the ellipse on the cathode ray tube without changing the axis lengths. I also employ the well known practice of applying controllable deflection voltages or currents to locate the ellipse at any point on the cathode ray tube screen.

By the addition of an elliptical signal generator to the cathode ray tube circuits and by supplying controls for varying simultaneously the voltage and phase of both the sinusoidal voltages and varying the deflection voltages in both the horizontal and vertical planes, a completely flexible indicator for cathode ray tube displays is formed. Such an indicator can be modified in size, shape and position in accordance with this invention so as to encompass an object or target displayed on the screen.

In accordance with another aspect of this invention, the controls for allowing such adjustment in size, orientation and placement also can constitute computer inputs to indicate or record at a particular time the position of the object, its size, and its orientation. Subsequent adjustment to the ellipse as may be made manually can form error signals or correction signals for introduction into the computer facility which will allow the determination of change in position, range, speed and other characteristics which are extremely useful in radar tracking.

This invention has particular application in weather radar for the tracking of cloud formations and allowing the gathering of meteorological data, as evidenced by changes in the size, shape, orientation, as well as position, of the cloud formations.

It is therefore a general object of this invention to improve cathode ray tube displays.

A more specific object of this invention is to provide an indicator for cathode ray tube displays of greater flexibility than heretofore available.

Still another object of this invention is to provide an indicator which is variable in several respects, and in which the controls for varying the indicator form source information inputs for computer facilities.

One specific embodiment of this invention comprises a typical radar installation including a pulse transmitter and a pulse receiver, both connected through a transmit-receive switch to a common antenna. The receiver includes a cathode ray tube for display of information reflected from a distant object and received by the antenna. Connected between the receiver proper and the cathode ray tube display is an electronic time-sharing switch for allowing the sequential display of the incoming signal and the elliptical indicator from the ellipse generator of this invention.

The ellipse generator comprises a pair of sine wave sources, each connected through respective variable resistances to apply sinusoidal voltages of controllable amplitude to respective sine-cosine potentiometers. Both of the sine-cosine potentiometers include two wiper arms placed at 90° intervals for deriving both sine and cosine functions. The two potentiometers are coupled for simultaneous adjustment of the position of the pair of arms through an angle $\theta$. The cosine $\theta$ output from a first arm of each potentiometer is introduced into a separate D.C. amplifier, and the sine $\theta$ output from the second arm of each potentiometer is introduced into the opposite D.C. amplifier from the cosine $\theta$ input. Each amplifier has an additional voltage input with a potentiometer adjustment to provide displacement of the display in the X and Y directions. The output of one of the amplifiers is employed to control the deflection of the electron beam of the cathode ray tube along the horizontal axis, while the output of the second D.C. amplifier is employed to deflect the electron beam along the vertical axis.

One feature of this invention relates to the provision in a cathode ray tube circuit of means for generating a variable size and position indicator.

Another feature of this invention relates to the generation of an elliptical indicator of variable size and shape by means of independently controllable voltage sources coupled to the horizontal and vertical deflecting means of the cathode ray tube.

Another feature is a control for simultaneously adjusting the phase of sinusoidal voltage sources with respect to each other, to provide a controllable orientation of the display generated by the two voltage sources.

Another feature is the provision of individual controls for controlling the length of the major and minor axes of the elliptical display formed.

Still another feature relates to the connection of the controls to constitute information inputs to a computer for handling object change data.

A clear understanding of this invention may be had from the following detailed description, with reference to the drawing, in which:

FIG. 1 is a block diagram of a radar system incorporating this invention.

FIGS. 2a, 2b and 2c are representations of the elliptical indicator produced by this invention as it appears on a cathode ray tube screen along with object representations.

Figure 3:
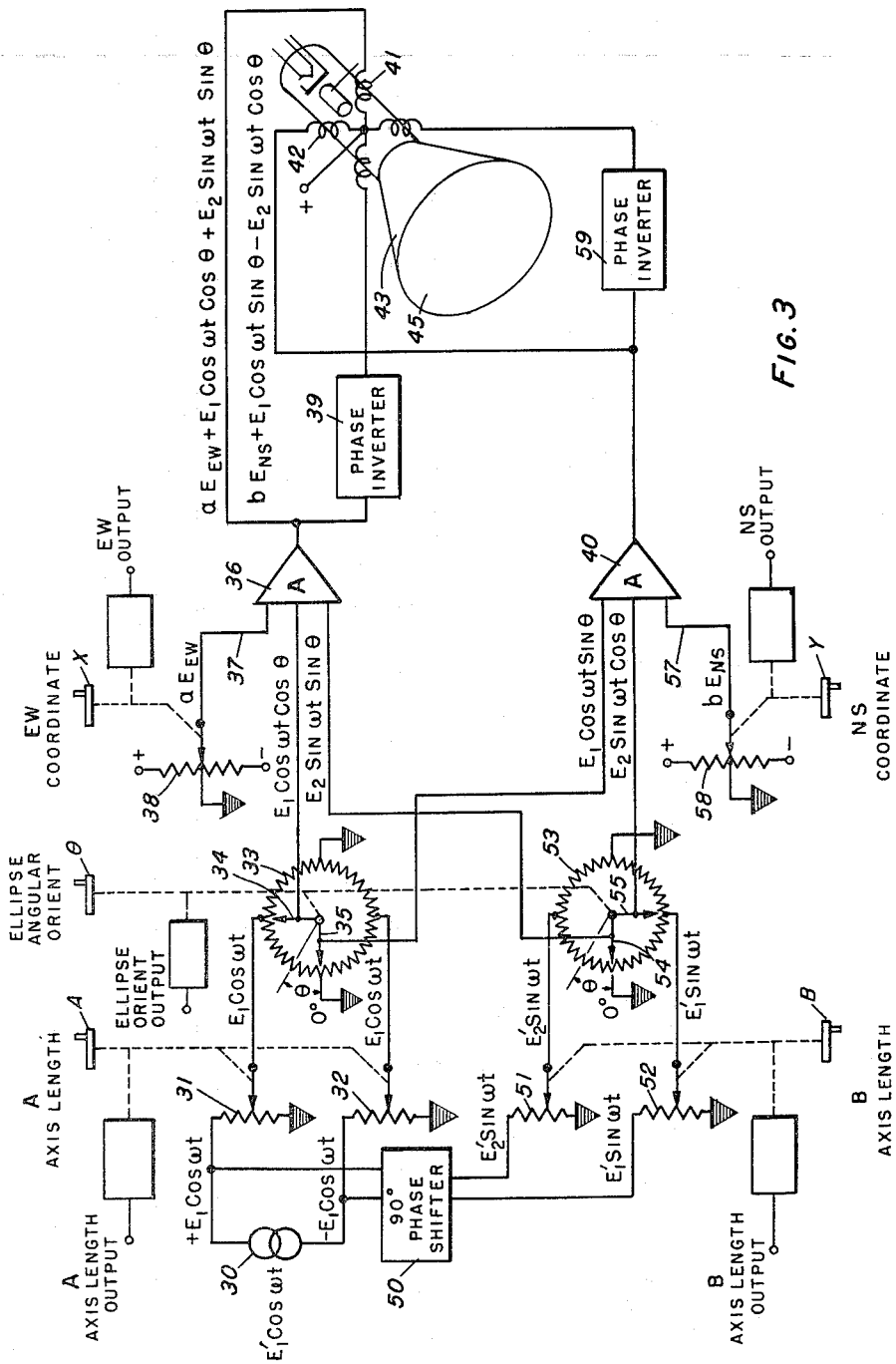
FIG. 3 is a schematic of the elliptical signal generator of this invention.

Referring now to FIG. 1, in which a typical radar system employing this invention is shown, the system includes a transmitter 10 and a receiver 11, both connected through a transmit-receive switch 12 to an antenna 13 for joint use of the antenna 13. In such a system, the receiver customarily employs some form of display, usually on the face of a cathode ray tube. In this embodiment, a cathode ray tube 14 is shown separate from the receiver 11 with an intervening time-share switch 15 allowing the receiver and an elliptical signal generator 16 to share time of the cathode ray tube 14. In one preferred embodiment, an electronic time-share switch 15 allows the signal information from the receiver 11 to be displayed on the cathode ray tube 14 for a period approximately 14 or 15 times as long as information from the elliptical signal generator 16. The persistence of the screen of the cathode ray tube 14 is sufficient to allow the trace produced by the elliptical signal generator 16 to remain on the screen during the time of representation of information from the antenna 13.

The elliptical signal generator 16 is shown as including five manual controls 20 which will hereinafter be described in more detail. The five controls 20, in addition to adjusting the output of the generator 16 to the switch 15, also control analog signal inputs to a computer 21 employed for determining the rate of change and nature of change in the objects displayed on the cathode ray tube. The five inputs to the computer 21 from the elliptical signal generator 16 are: (1) the A axis length of the ellipse, (2) the B axis length, (3) $\theta$, the angle of the A axis with respect to the X axis of the cathode ray tube, (4) X, the horizontal displacement of the midpoint of the A axis with respect to the origin, and (5) Y, the vertical displacement of the midpoint of the A axis with respect to the origin. These five variables furnish all of the information necessary for the definition of the ellipse, including its size, shape, position and orientation on the cathode ray tube screen. These five inputs, in addition to a clock or timing input 22 to the computer 21, allow the recording and computation of the change in position and size of the object under observation over a period of time.

The purpose of the ellipse is to record the approximate location, shape and size of an object displayed on the screen in the manner shown in FIGS. 2a, 2b and 2c. In FIG. 2a, an object 23 (in this case, a cloud mass) appears in the second quadrant of the cathode ray tube screen 24. This cloud mass 23 is irregular in shape, as one would expect, but by the adjustment of the A and B axis lengths of the ellipse 25, the angle $\theta$ of the A axis with respect to the X axis, and the displacement in both the X and Y directions of that axis, the ellipse can be made to approximately register with the cloud 23 displayed on the screen 2 and provide the best practical registration with that signal. Registration with the displayed signal is accomplished by the operator in sequence, adjusting the X and Y controls to bring the indicator 25 into approximate registration with the center of the cloud mass or other signal displayed on the tube, adjusting the A axis length to approximate the over-all length of the cloud mass, adjusting the angle $\theta$ to bring the major axis into registration with the major axis of the display, and adjusting the B axis until the ellipse 25 fairly well coincides with the outline of the signal 23 displayed. Other cloud masses 26 and 27 are also shown on the cathode ray tube screen 24.

FIG. 2b is a representation of the same cathode ray tube screen 24 taken at a later time $t_2$. It will be noted that the cloud mass 23 has moved to an area designated by the coordinates $X_2$, $Y_2$, and has increased slightly in size. The elliptical indicator 25 still remains at the point $X_1$, $Y_1$ where it was originally displayed. The cathode ray tube screen 24 now shows the relative movement and change of size over the period of time between the first and second observation. It is advantageous to introduce into the computer 21 of FIG. 1 the exact nature of the changes from the original observation. This may be done by the operator adjusting the same five controls 20 to bring about a registration between the elliptical display 25 and the cloud 23 at time $t_2$, as shown in FIGS. 2b and 2c. At time $t_2$ both the X and Y values of the cloud have changed with respect to time $t_1$, and angle $\theta$ is similarly changed, indicating a relative movement with respect to the original observation. Both of the axes A and B have increased in length, indicating that the cloud mass has increased in size. As the operator makes the adjustments necessary to bring about registration at this later time, the corresponding information or correction is introduced into the computer 21.

In order to practice this invention, not only must an ellipse be generated, but each of the variables mentioned above must be independently adjustable so that either the major or minor axis may be changed without affecting the angular orientation or the coordinate position of this ellipse on the screen 24 of the cathode ray tube. Similarly, the angular orientation must be adjustable without affecting the other variables. This may be achieved in accordance with this invention by the apparatus shown in FIG. 3.

The embodiment of FIG. 3 comprises a sinusoidal wave generator 30 generating a wave indicated as $E'_1$ cosine $\omega t$. The sinusoidal generator 30 is connected through a pair of linear potentiometers 31 and 32 controlled by a common control A, identified as the A axis length control, to opposite sides of a sine-cosine potentiometer 33 so as to apply thereto a sinusoidal voltage of controlled amplitude $E_1$ cosine $\omega t$ to the sine-cosine potentiometer 33. The potentiometer 33 includes a pair of wiper arms 34 and 35 displaced by a 90° interval. The wiper arm 34 is connected to a D.C. operational amplifier 36, the function of which is to sum the input signals. The output from the wiper arm 35 is connected as an input to a second, similar D.C. amplifier 40. The amplifiers 36 and 40 form the basic deflection inputs for the horizontal and vertical deflecting means 41 and 42, in this case coils, of a cathode ray tube 43. In the embodiment shown, the information signal inputs are omitted for the purpose of clarity. As is apparent in FIG. 1, the deflecting means 41 and 42 are time-shared between a signal source and the elliptical signal generator, so as to display both the information signal and the elliptical indicator on the screen 45. Of course, individual deflecting means, coils or plates might be used for the two signals.

Also connected to the sinusoidal wave generator 30 is a 90° phase shifter 50, producing a wave $E_2'$ sin $\omega t$, which in turn is connected to a pair of linear potentiometers 51 and 52 coupled together for simultaneous movement by a control B in a manner similar to the linear potentiometers 31 and 32 described above. The outputs of these potentiometers 51 and 52 are applied to opposite sides of the second sine-cosine potentiometer 53. This potentiometer includes a pair of wiper arms 54 and 55 similarly displayed by 90°, and the arms 54 and 55 are connected through a common control $\theta$ to those of the sine-cosine potentiometer 33 so that all can be varied simultaneously.

The wiper arms of the sine-cosine potentiometer 53 mechanically lag those of the sine-cosine potentiometer 33 by 90°. The wiper arm 54 is connected to the D.C. amplifier 36, and the wiper arm 55 is connected to the D.C. amplifier 40. The D.C. amplifier 36 therefore has two sinusoidal inputs. They are: (1) a function of the wave cosine $\omega t$ produced by the sinusoidal signal generator 30, as modified by a function of the position of the A axis length potentiometer wiper arms 31 and 32 and a function of the cosine of $\theta$ where $\theta$ is the angle of displacement of the wiper arms of the sine-cosine potentiometers 35 and 55 with respect to a zero angle; and (2) a similarly derived function of the wave sine $\omega t$ as modified by the B axis length control setting and the sine of $\theta$. The sinusoidal inputs to the D.C. amplifier 40 are respectively: (1) a function of the wave cosine $\omega t$, modified by the A axis length control setting and the sine of $\theta$; and (2) a function of the wave sine $\omega t$, modified by the B axis length control setting and the cosine of $\theta$.

In addition to these sinusoidal inputs, which define the major and minor axes of the ellipse and its angular orientation, there are two voltage input leads 37 and 57, respectively, to the amplifiers 36 and 40. The potential on the input 37 to the amplifier 36 is derived from a linear potentiometer 38, the opposite ends of which are connected to voltage sources of opposite potential so that a voltage identified as $aE_{ew}$, the east-west deflection voltage, introduced into the amplifier 36 may vary from positive to zero to negative. An identically connected potentiometer 58 forms the north-south deflection input $bE_{ns}$ to amplifier 40. These linear potentiometers 38 and 58 have respective controls X and Y, the east-west coordinate control and north-south coordinate control respectively, since each defines the displacement of the intersection of the axes of the ellipse from the origin of the X and Y axes of the cathode ray tube 43.

The output of the amplifier 36, which is the sum of the controlled east-west D.C. voltage $aE_{ew}$ and the sinusoidal voltage $E_1$ cosine $\omega t$ cosine $\theta$ and $E_2$ sine $\omega t$ sine $\theta$, is applied to one end of the horizontal deflection coil 41, and is also applied through a phase inverter 39 to the opposite end of the horizontal deflection coil 41 to form a conventional push-pull deflection circuit. The output of the amplifier 40, which is the sum of the controlled north-south D.C. voltage $bE_{ns}$ and the sinusoidal voltages $E_1$ cosine $\omega t$ sine $\theta$ and $E_2$ sine $\omega t$ cosine $\theta$, is applied to one side of the vertical deflection coil 42 and is also applied through a phase inverter 59 to the opposite side of the vertical deflection coil 42 to form a push-pull deflection circuit. Of course, single-ended deflection circuits may be used, eliminating the phase inverters 39 and 59 and grounding one end of the deflection coils 41 and 42.

The signals applied to the two deflection coils of the cathode ray tube are therefore functions of two mathematical equations:

$$V_1 = aE_{ew} + E_1 \cos \omega t \cos \theta + E_2 \sin \omega t \sin \theta \quad (1)$$

and $$V_2 = bE_{ns} + E_1 \cos \omega t \sin \theta - E_2 \sin \omega t \cos \theta \quad (2)$$

These equations described a family of ellipses when $V_1$ is plotted versus $V_2$ in rectangular coordinates. The family of ellipses mathematically fulfill the requirements of three independent adjustments described above.

As indicated above, in order for this invention to truly represent the axis length and inclination, as well as displacement of a display cathode ray tube, and to allow the adjustment without interaction between the various controls, it is essential that the effect of each control be independent. This can be established mathematically by showing that the angle $\theta$ of inclination of the ellipse as generated by this apparatus is independent of both the major and minor axis length. Taking Equations 1 and 2 above and setting the terms $aE_{ew}$ and $bE_{ns}$ equal to zero to consider the equation for generating an ellipse about the origin, it is possible in these simplified equations to solve for $\cos \omega t$ and $\sin \omega t$ in terms of $E_1$, $E_2$, $\theta$, $V_1$ and $V_2$:

$$\cos \omega t = \frac{V_1 \cos \theta + V_2 \sin \theta}{E_1} \quad (3)$$

and $$\sin \omega t = \frac{V_1 \sin \theta - V_2 \cos \theta}{E_2} \quad (4)$$

Since $\sin \omega t = \sqrt{1 - \cos^2 \omega t}$. Equations 3 and 4 may be combined to eliminate $\omega t$. Therefore:

$$1 - \frac{(V_1 \cos \theta + V_2 \sin \theta)^2}{E_1} = \frac{(V_1 \sin \theta - V_2 \cos \theta)^2}{E_2} \quad (5)$$

This equation simplifies to the form:

$$(V_1)^2 [E_1^2 \sin^2 \theta + E_2^2 \cos^2 \theta] - 2V_1 V_2 [E_1^2 - E_2^2] \sin \theta \cos \theta + (V_2)^2 [E_1^2 \cos^2 \theta + E_2^2 \sin^2 \theta] E_1^2 E_2^2 \quad (6)$$

This is the form of a general equation for an ellipse with the major and minor axes not necessarily along the X and Y coordinate axes. The objective is to establish that $\theta$ is exactly the rotation angle with respect to the X axis. This may be done by converting the equation to the polar system.

Since $\theta$ is being used, let $(\rho, \varphi)$ to the polar coordinates. Using the transformation equations $V_1 = \rho \cos \varphi$ and $V_2 = \rho \sin \varphi$, Equation 6 becomes:

$$\rho^2 \cos^2 \varphi (E_1^2 \sin^2 \theta + E_2^2 \cos^2 \theta)$$
$$-2\rho^2 \sin \varphi \cos \varphi (E_1^2 - E_2^2) \sin \theta \cos \theta + \rho^2 \sin^2 \varphi$$
$$(E_1^2 \cos^2 \theta + E_2^2 \sin^2 \theta) = E_1^2 E_2^2 \quad (7)$$

which may be rewritten as:

$$\rho^2 = \frac{E_1^2 E_2^2}{\cos^2 \varphi (E_1^2 \sin^2 \theta + E_2^2 \cos^2 \theta) - 2 \sin \varphi \cos \varphi (E_1^2 - E_2^2) \sin \theta \cos \theta + \sin^2 \varphi (E_1^2 \cos^2 \theta + E_2^2 \sin^2 \theta)} \quad (8)$$

The maximum value of $\rho$ must lie along the major axis and the minimum value along the minor axis. If Equation 8 is therefore differentiated with respect to $\varphi$ $$\left(\text{i.e.,} \frac{d\rho}{d\varphi}\right)$$

the value of $\varphi$ may be found for the major and minor axes. This leads to:

$$\frac{d\rho}{d\varphi} = \sin \varphi \cos \varphi (\cos^2 \theta - \sin^2 \theta)[E_1^2 - E_2^2]$$
$$- (\cos^2 \varphi - \sin^2 \varphi)(E_1^2 E_2^2) \sin \theta \cos \theta \quad (9)$$

One obvious solution is $E_1 = E_2$, which is the solution for a circle, and there is no major or minor axis.

Equation 9 may be arranged as a quadratic in terms of $\tan \varphi$ by dividing through by $\cos^2 \varphi \cos^2 \theta$:

$$\tan^2 \varphi \tan \theta + \tan \varphi (1 - \tan^2 \theta) - \tan \theta = 0 \quad (10)$$

which factors to:

$$(\tan \varphi - \tan \theta)(\tan \varphi \tan \theta + 1) = 0 \quad (10a)$$

and yields:

$$\tan \varphi_1 = \tan \theta \quad (11a)$$

$$\tan \varphi_2 = \frac{-1}{\tan \theta} \quad (11b)$$

which give the values of $\varphi$ as:

$$\varphi_1 = \theta \pm \pi \quad (12a)$$

and $$\varphi_2 = \theta \pm \frac{\pi}{2} \quad (12b)$$

This states that the axes have rotated $\theta°$. To show that the amplitudes of the major and minor axes have not changed, substitute $\theta$ for $\varphi$ in Equation 8 for one and $$\left(\theta + \frac{\pi}{2}\right)$$

for the other. The two values obtained are:

$$\rho_{max} = E_1 \quad (13a)$$

and $$\rho_{min} = E_2 \quad (13b)$$

which are the amplitudes of the major and minor axes when $\theta = 0°$.

It is above demonstrated that, employing the independent controls described above, the generation and complete control of an elliptical indicator may be accomplished on the cathode ray tube. The elliptical indicator, having broader application for a variety of signals to be identified than indicators heretofore available, has the further advantage of allowing the direct application of the control voltages used in generating the indicator as inputs to a computer to describe changes in the position, orientation and size of the particular object of interest described on the cathode ray tube.

Although for the purpose of explaining the invention a particular embodiment thereof has been shown and described, obvious modifications will occur to a person

I claim:

1. An elliptical signal generator for a cathode ray oscilloscope having horizontal and vertical beam-deflecting means, comprising: means for producing a first sinusoidal voltage, means for producing a second sinusoidal voltage 90° out of phase with the first sinusoidal voltage, a first linear potentiometer for varying the level of the first sinusoidal voltage, a second linear potentiometer for varying the level of the second sinusoidal voltage, a first sine-cosine potentiometer, a second sine-cosine potentiometer, means connecting the output of the first linear potentiometer across the first sine-cosine potentiometer, means connecting the output of the second linear potentiometer across the second sine-cosine potentiometer, means coupling the first and second sine-cosine potentiometers for adjustment in unison to modify the output thereof as a function of the sine and cosine of an angle $\theta$, the angle of adjustment of the sine-cosine potentiometers, means applying a cosine function of the first sinusoidal voltage and a sine function of the second sinusoidal voltage to one of the deflection means of the cathode ray oscilloscope, and means applying a sine function of the first sinusoidal voltage and a cosine function of the second sinusoidal voltage to the other deflection means of the cathode ray oscilloscope.

2. An elliptical signal generator for a cathode ray oscilloscope including horizontal and vertical beam-deflecting means, means for producing a first sinusoidal voltage, means for producing a second sinusoidal voltage 90° out of phase with the first sinusoidal voltage, means for controlling the level of the first and second sinusoidal voltages independently, a first sine-cosine potentiometer including first and second wiper arms 90° out of phase with each other, a second sine-cosine potentiometer including third and fourth wiper arms 90° out of phase with each other and with the first and second wiper arms, means including a level control for applying the first sinusoidal voltage across the first potentiometer, means including a level control for applying the second sinusoidal voltage across the second potentiometer, means for applying the output of the first and third wiper arms to the horizontal deflection means of the cathode ray oscilloscope, means applying the output of the second and fourth wiper arms to the vertical deflection means of the cathode ray oscilloscope, and means for coupling all of the wiper arms for controllable adjustment to vary the angle of orientation of the display in the cathode ray oscilloscope.

3. The combination in accordance with claim 2 including means for supplying independently controllable deflection voltages to both the horizontal and vertical deflection means to produce displacement of the display in both the X and Y direction.

4. An elliptical signal generator for a cathode ray oscilloscope display comprising a cathode ray oscilloscope including horizontal and vertical beam-deflecting means, means for producing a first sinusoidal voltage, means for producing a second sinusoidal voltage 90° out of phase with the first sinusoidal voltage, a first linear potentiometer for varying the level of the first sinusoidal voltage, a second linear potentiometer for varying the level of the second sinusoidal voltage, means for deriving the sine and cosine function of a selected angle $\theta$, means for connecting the sinusoidal voltage-generating means to modify the level of the sinusoidal voltage as a function of the sine and cosine of the selected angle $\theta$, means connecting the second sinusoidal voltage-generating means to modify the level of the second sinusoidal voltage as a function of the sine and cosine of the selected angle $\theta$, means connecting the cosine output of the first modifying means and the sine output of the second modifying means to one of the deflection circuits of the cathode ray oscilloscope, means connecting the sine output of the first modifying means and the cosine output of the second modifying means to the other deflection circuit in the cathode ray tube, and means for varying the selected angle $\theta$.

5. In a cathode ray oscilloscope having horizontal and vertical beam-deflecting means, an elliptical indicator generator comprising means for producing a first sinusoidal voltage, means for producing a second sinusoidal voltage 90° out of phase with the first sinusoidal voltage, a pair of sine-cosine potentiometers coupled to respective sine sinusoidal voltage-producing means for varying the level of the sinusoidal voltages as functions of both the sine and cosine of the selected angle $\theta$, first means for combining the cosine function of the first sinusoidal voltage and the sine function of the second sinusoidal voltage, means for applying the output of the first combining means to the horizontal deflecting means of the cathode ray oscilloscope, second means for combining the sine function of the first sinusoidal voltage in the cosine function of the second sinusoidal voltage, means for applying the output of the second combining means to the vertical deflecting means of the cathode ray oscilloscope, and means for varying the selected angle $\theta$.

6. An elliptical signal generator for a cathode ray oscilloscope comprising a cathode ray oscilloscope including horizontal and vertical beam-deflecting means, means for producing a first sinusoidal voltage, means for producing a second sinusoidal voltage 90° out of phase with the first sinusoidal voltage, means for independently varying the maximum amplitude of the sinusoidal voltages, means for modifying the first sinusoidal voltage as a function of each the sine and cosine of the selected angle $\theta$, means for modifying the second sinusoidal voltage as a function of each the sine and cosine of the selected angle $\theta$, means for combining the cosine function of the first sinusoidal voltage and the sine function of the second sinusoidal voltage, means for combining the sine function of the first sinusoidal voltage and the cosine function of the second sinusoidal voltage, means applying the first combined voltage to one deflection circuit of the cathode ray oscilloscope, means applying the second combined voltage to the other deflection circuit of the cathode ray oscilloscope, and means for varying the angle $\theta$.

7. The combination in accordance with claim 6 wherein first and second modifying means comprise sine-cosine potentiometers.

8. The combination in accordance with claim 6 wherein the maximum amplitude-varying means comprises a pair of independently controllable linear potentiometers.

9. The combination in accordance with claim 6 wherein the combination includes means for applying independently controllable deflection potentials to the vertical and horizontal deflecting means of the cathode ray oscilloscope.

References Cited in the file of this patent

UNITED STATES PATENTS

| | | |
|---|---|---|
| 2,403,967 | Busignes | July 16, 1946 |
| 2,406,799 | Busignes | Sept. 3, 1946 |
| 2,421,747 | Engelhardt | June 10, 1947 |
| 2,464,558 | Dammers | Mar. 15, 1949 |
| 2,618,764 | Rieber | Nov. 18, 1952 |
| 2,873,405 | Iwerks | Feb. 10, 1959 |